(12) United States Patent
Daniel et al.

(10) Patent No.: US 10,035,209 B2
(45) Date of Patent: Jul. 31, 2018

(54) ADAPTIVE GMAW SHORT CIRCUIT FREQUENCY CONTROL

(75) Inventors: Joseph A Daniel, Sagamore Hills, OH (US); James E Hearn, Brunswick, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 1937 days.

(21) Appl. No.: 12/406,475

(22) Filed: Mar. 18, 2009

(65) Prior Publication Data

US 2010/0237052 A1    Sep. 23, 2010

(51) Int. Cl.
   *B23K 9/10*    (2006.01)
   *B23K 9/073*   (2006.01)
   *B23K 9/095*   (2006.01)

(52) U.S. Cl.
   CPC .......... *B23K 9/0731* (2013.01); *B23K 9/0953* (2013.01)

(58) Field of Classification Search
   CPC ............. B23K 9/10; B23K 9/00; B23K 9/028
   USPC ........... 219/130.1, 130.5, 130.33, 136, 137.7
   See application file for complete search history.

(56) References Cited

U.S. PATENT DOCUMENTS

| | | | |
|---|---|---|---|
| 3,673,377 A * | 6/1972 | Erdmann-Jesnitzer et al. | 219/130.31 |
| 4,518,844 A * | 5/1985 | Needham | 219/137 PS |
| 4,525,621 A * | 6/1985 | Puschner | 219/137 PS |
| 4,553,018 A * | 11/1985 | Kondo et al. | 219/130.51 |
| 4,647,754 A * | 3/1987 | Hirasawa | 219/130.21 |
| 5,221,825 A * | 6/1993 | Siewert et al. | 219/130.01 |
| 5,756,967 A * | 5/1998 | Quinn et al. | 219/130.21 |
| 6,002,104 A * | 12/1999 | Hsu | 219/130.5 |
| 6,034,350 A * | 3/2000 | Heraly et al. | 219/130.4 |
| 6,156,998 A * | 12/2000 | Takahashi et al. | 219/130.21 |
| 6,441,342 B1 * | 8/2002 | Hsu | 219/130.01 |
| 6,744,011 B1 * | 6/2004 | Hu et al. | 219/130.01 |
| 7,091,446 B2 * | 8/2006 | Houston et al. | 219/130.51 |
| 8,389,897 B2 * | 3/2013 | Sardy et al. | 219/130.1 |
| 8,513,568 B2 * | 8/2013 | Kawamoto et al. | 219/130.21 |
| 2005/0189334 A1 * | 9/2005 | Stava | 219/130.51 |
| 2005/0269306 A1 * | 12/2005 | Fulmer et al. | 219/130.51 |
| 2009/0242534 A1 * | 10/2009 | Artelsmair et al. | 219/137 PS |
| 2010/0133250 A1 * | 6/2010 | Sardy et al. | 219/130.31 |

FOREIGN PATENT DOCUMENTS

JP           409314328 A  *  9/1996  ............ B23K 9/095

* cited by examiner

*Primary Examiner* — Dana Ross
*Assistant Examiner* — Ayub Maye
(74) *Attorney, Agent, or Firm* — Perkins Coie LLP

(57) ABSTRACT

A welding apparatus having a waveform compensation device, a power section coupled to the waveform compensation device which generates a welding waveform in accordance with a signal from the waveform compensation device, and a frequency detection device which detects at least one of a voltage, current and power of a welding arc and determines a shorting frequency of the arc. The waveform compensation device adjusts at least a portion of the welding waveform based on an output from the frequency detection device.

45 Claims, 4 Drawing Sheets

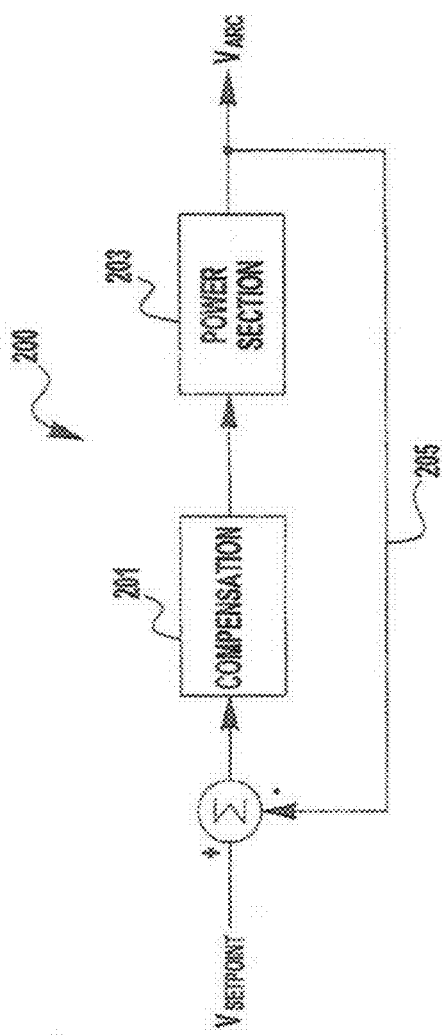
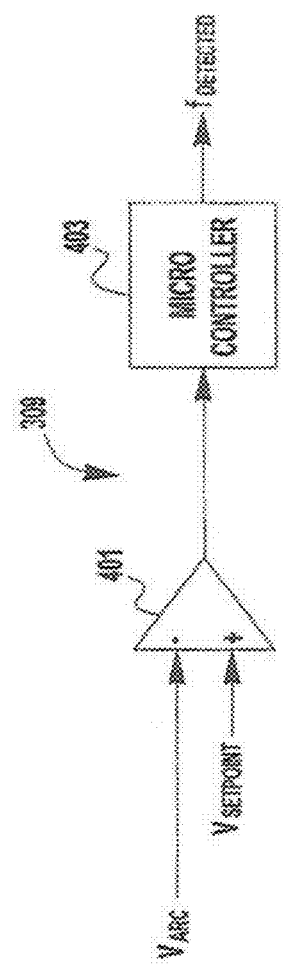
FIG. 2
FIG. 4

ADAPTIVE GMAW SHORT CIRCUIT FREQUENCY CONTROL

BACKGROUND OF THE INVENTION

1. Field of the Invention

Devices, systems, and methods consistent with the invention relate to a method and apparatus for adaptive GMAW short circuit frequency control.

2. Description of the Related Art

As is well know, welding requires the creation of a welding arc which is used to perform the welding operation. It is also known that to perform proper welding the welding arc must be stable. That is, for many welding operations, there is a need to maintain the voltage, current, and/or frequency of the welding arc to ensure that a proper weld is performed.

For many types of welding techniques, such as gas metal arc welding ("GMAW"), the arc pulse frequency is to be maintained relatively constant throughout the welding process, so as to ensure a proper weld is achieved. The welding voltage and/or current are often used to control the arc pulse frequency. That is, in a typical system, an operator must preset the welding voltage and/or current in an effort to obtain the desired welding arc performance, such as pulse frequency.

However, a problem exists because every welding operation is different and the differences can change the electrical properties of the current path such that the voltage and/or current settings need to be different from welding operation to welding operation. This requires the welder to adjust or tune the voltage and/or current settings based on their experience and "best guess" as to what the settings should be.

FIG. 1 shows an electrical circuit 100 which is indicative of a typical welding operation. The electrical current and voltage for the welding operation is provided from the welding power source 101. The current/voltage is directed from the power source 101 through the conductor 105 which is coupled with the welding gun (not shown). The gun provides the current/voltage to the welding electrode (not shown) to create the welding arc 107 between the electrode and a workpiece 103. The current/voltage passes through the work piece and is conducted back to the power source 101 via another conductor 109 which is connected to a negative terminal of the power source 101.

It is known that each conduction path within an electrical system (such as a welding circuit) has various electrical properties such as resistance and inductance which affect the current/voltage through the conduction path. However, during a welding operation these variables can change because the conduction paths are constantly changing during welding. For example, a typical welding operation requires the welding arc 107 to move along the workpiece 103. The movement of the arc 107 changes the distance between the arc 107 and where the negative conductor 109 is attached to the workpiece 103. The distance can either grow or decrease. This change in the distance causes a change in the electrical properties of the current path between the arc 107 and the negative conductor 109, through the workpiece 103. For example, the resistance can increase or decrease. Of course, other electrical variables can change.

Thus, these changes dynamically affect the performance of the welding operation and typically can not be adjusted "on the fly" or can not be properly taken into account when setting the initial voltage and/or current settings.

Additionally, the conductors 105 and 109 can affect the welding operation. That is, even though their properties typically do not change during a single welding operation, they may change between different welding operations. For example, it may be required for a welder to use a longer or shorter negative conductor 109. The change in length can change the resistance and/or impedance between welding operations.

Because of the foregoing, the welding process can change dynamically during the welding operation and between different welding operations. This requires a welder to carefully tune the voltage, current and/or frequency based on experience, feel and/or a best guess as to the proper settings. This imparts an amount of error into the welding operation. Further, because the current path properties change during welding the welding quality can decrease during welding even if the settings are properly set initially.

Accordingly, a need exists for a welding method and apparatus which addresses the above drawbacks of current welding systems.

BRIEF SUMMARY OF THE INVENTION

An exemplary embodiment of the present invention provides, a welding apparatus, having a waveform compensation device, a power section coupled to the waveform compensation device which generates a welding waveform in accordance with a signal from the waveform compensation device, and a frequency detection device which detects at least one of a voltage, current and power of a welding arc and determines a shorting frequency of the arc. The waveform compensation device adjusts at least a portion of the welding waveform based on an output from the frequency detection device.

BRIEF DESCRIPTION OF THE DRAWINGS

The above and/or other aspects of the invention will be more apparent by describing in detail exemplary embodiments of the invention with reference to the accompanying drawings, in which:

FIG. 2 illustrates a diagrammatical representation of a typical voltage control system;

FIG. 4 illustrates a diagrammatical representation of a comparator circuit in accordance with an exemplary embodiment of the present invention.

DETAILED DESCRIPTION OF EXEMPLARY EMBODIMENTS

Figure 1:
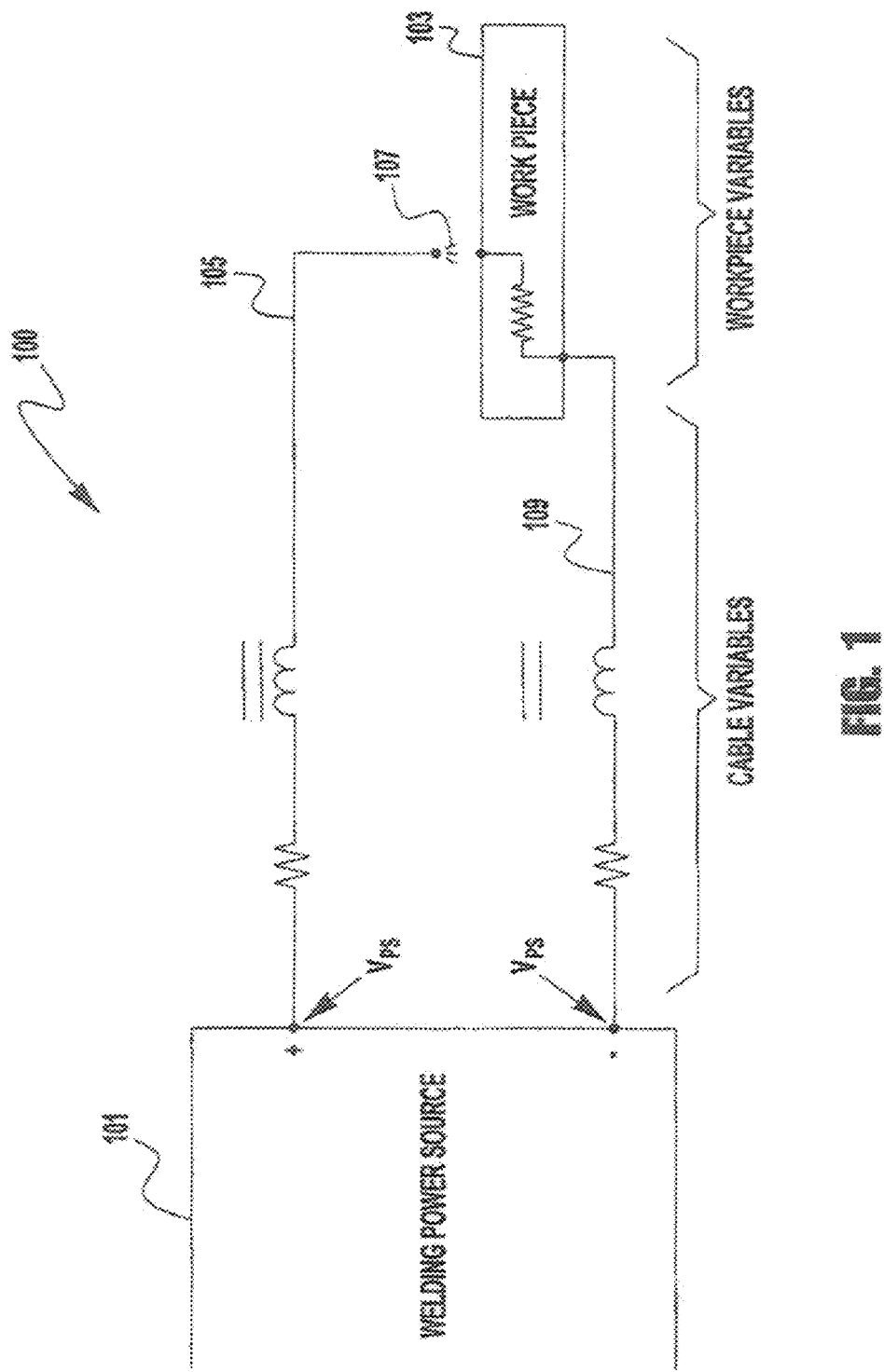
FIG. 1 illustrates a diagrammatical representation of a current path of a typical welding system.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

As discussed above, FIG. 1 depicts a current path for a typical welding operation. FIG. 2 depicts a typical voltage control circuit 200 used to maintain a constant voltage during a welding operation. As indicated above, known systems often require a welder to input a voltage ($V_{setpoint}$) based on experience or a "best guess" as to what is needed for a specific welding operation. The welder typically sets this voltage and/or current so as to obtain an optimal and consistent frequency at the welding arc during the welding operation. The system 200 then uses feedback 205 from the welding arc ($V_{arc}$) to determine whether or not the welding arc has the required voltage. A typical compensation circuit 201 is used to control the power section 203 (or plant) of the system 200 to ensure that the voltage setpoint is maintained.

However, a problem with this configuration is that because of the reasons discussed above the voltage setpoint, as set at the beginning operation, may not be optimal for a particular welding operation as the welding operation progresses. For example, as the welding operation progresses the resistance and/or impedance in the circuit 100 changes These changes can result in changing the arc voltage needed to maintain the optimal and consistent shorting frequency. Specifically, as the properties of the welding current path change it may be necessary to change the arc voltage to ensure that a proper shorting frequency is maintained at the welding arc. That is, for example it may be needed to maintain a consistent short arc transfer frequency during a welding operation. The system 200 shown in FIG. 2 is incapable of making this change because it is designed only to maintain the voltage at the preset voltage setpoint. Thus, because the system 200 maintains the initial voltage setpoint it can result in changing the welding frequency during the welding operation, which can result in a poor weld. For example, if the arc voltage becomes too high, with respect to what is needed to maintain the proper shorting welding frequency, the welding frequency will decrease and alternatively, as the arc voltage decreases, with respect to what is needed, the arc shorting frequency becomes too high.

Therefore, systems such as those shown in FIG. 2 are incapable of easily or dynamically changing the arc voltage to adapt to a dynamically changing welding circuit to maintain the desired shorting frequency for a welding operation.

Exemplary embodiments of the present invention address these drawbacks.

Figure 3:
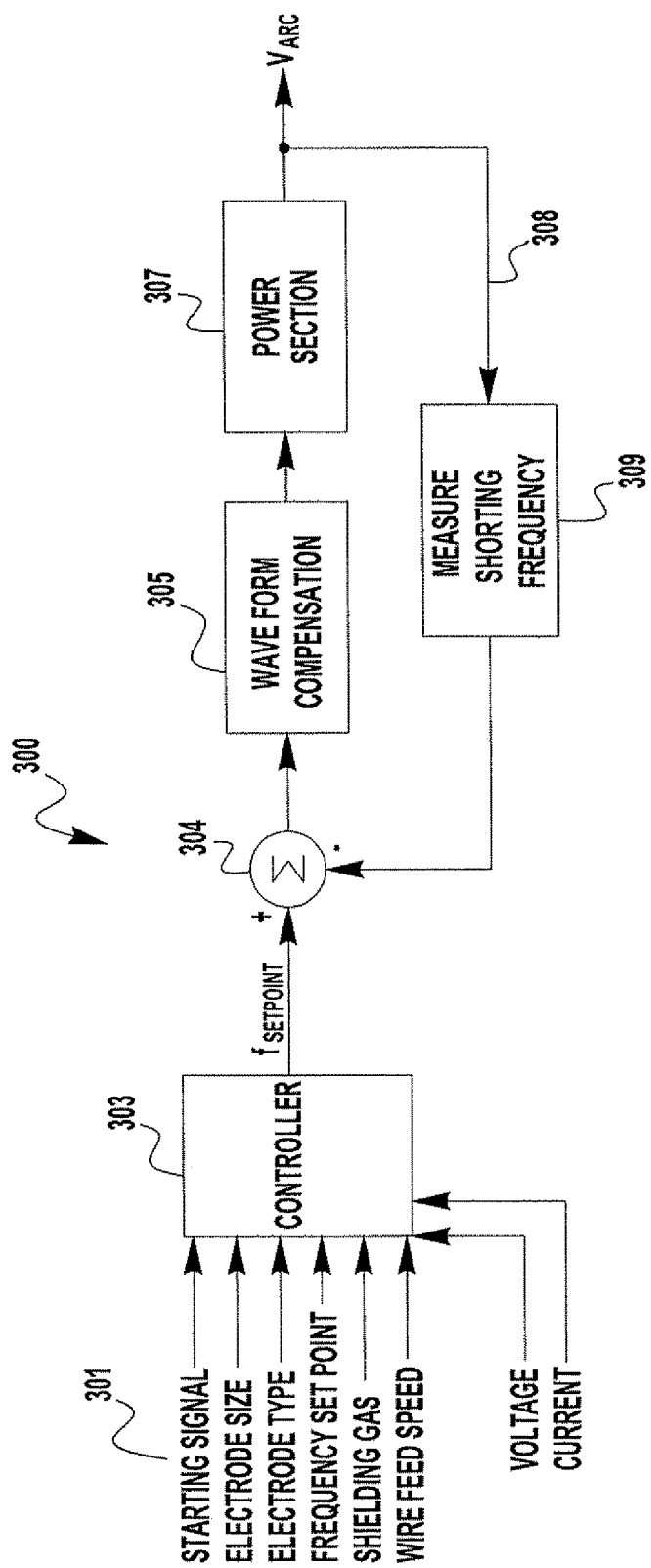
FIG. 3 illustrates a diagrammatical representation of a voltage control system in accordance with an exemplary embodiment of the present invention.

Turning now to FIG. 3, an exemplary embodiment of the present invention is depicted, which is a welding system 100 with adaptive frequency control. In an exemplary embodiment of the present invention, the system 300 is used to provide adaptive shorting frequency control in a gas metal arc welding (GMAW) welding device. However, the present invention is not limited in this regard and can be used in other types of welding devices. In this exemplary embodiment, the system 300 contains a controller device 303, a summer circuit 304, a waveform compensation device 305, a power section 307 (or plant), a feedback circuit 308, and a shorting frequency detection device 309.

Prior to welding, a welder enters at least one (or perhaps more than one) input parameter 301. For example, a welder can input any one or a combination of (1) welding electrode size, (2) electrode type, (3) shielding gas type, (4) wire feed speed, (5) frequency setpoint, (6) welding voltage, and/or (7) welding current. Additional input parameters can include welding power and travel speed. Of course, the present invention is not limited to these input parameters. It is recognized that other parameters may be used without departing from the scope and spirit of the present invention. Other parameters can include but are not limited to, weld metal type, weld metal thickness and welding position. The input parameters 301 are received by a controller device 303, which can be any known or commonly used computing or microprocessing device, which uses the input parameters 301 to determine a welding frequency setpoint ($f_{setpoint}$). The controller device 303 can use a look up table or various algorithms to determine the desired frequency setpoint. Of course, if the frequency setpoint is entered as an input parameter 301, the device 303 maintains that setpoint as input.

In a further exemplary embodiment, if the frequency setpoint is input as an input parameter 301 but it is set at a value which is inconsistent with other input parameters 301, the controller device 303 is capable of displaying an error message, or the like, to the welder to advise of the apparent conflict.

During the welding operation, the waveform compensation device 305, which can be a PID controller and welding waveform generator, controls the power section 307 to provide the proper welding waveform and welding arc, including the welding frequency as set by the frequency setpoint. The power section 307 of the system 300 can be of any known welding device topology. For example, the power section 307 can be of an inverter type or a transformer type, or the like. The present invention is not limited in this regard. A feedback circuit 308 detects the voltage of the welding arc and uses a frequency detection device 309 to determine the shorting frequency of the welding arc. The detected shorting frequency is then directed to the summer circuit 304 which sums the detected shorting frequency with the frequency setpoint. If a difference is detected/determined, the waveform compensation device 305 then sends a signal to the to the power section 307 to compensate for the detected difference to maintain the desired welding frequency. For example, the waveform compensation device 305 and the power section 307 can adjust the current and/or voltage of the waveform dynamically.

It is noted that FIG. 3 depicts the system 300 as a series of separate components. However, it is contemplated that in various embodiments of the present invention, all of the components of the system 300 are located within a single welding device. Additionally, the present invention is also not limited to having the various depicted components as being physically separate from each other. For example, it is contemplated that the summer 304 is part of the controller device 303 or part of the waveform compensation device 305. Similarly, in another exemplary embodiment each of the summer 304 and the waveform compensation device 305 are integral with the power section 307. For example, a single control board or electronics package can be used within a welding device which includes/embodies each or at least some of the controller device 303, summer 304, waveform compensation device 305 and frequency detection device 309. The present invention is not limited in this regard.

Similarly, although a summer device 304 is shown to sum the frequency setpoint with the signal from the frequency detection device 309, embodiments of the present invention can use other methodologies to accomplish the same purpose. For example, a comparator circuit can be employed, as well as any other circuitry or logic which will compare the two signals and provide an output signal to the waveform compensation device 305 based on a comparison of those two signals. This is well within the capabilities of those skilled in the art.

As indicated above, in an exemplary embodiment of the present invention, the feedback circuit 308 detects the voltage of the welding arc. However, the present invention is not limited in this regard. That is, it is contemplated that other exemplary embodiments of the present invention can detect the arc current, frequency and/or power, as well as voltage. Because those of ordinary skill in the art, coupled with the knowledge set forth herein, are capable of employing and incorporating a feedback circuit 308 which detects any one or a combination of the above arc properties, these various embodiments will not be discussed in detail herein. The following discussion will focus on an embodiment which uses the welding arc voltage to determine the shorting frequency of the arc.

In an embodiment of the present invention the feedback circuit 308 detects an arc voltage ($V_{arc}$). This arc voltage is received at the frequency detection device 309. The frequency detection device 309 includes a frequency converter which converts the detected voltage to a frequency. An exemplary embodiment of a frequency detection device 309 is depicted in FIG. 4.

As shown in FIG. 4, an exemplary embodiment of the frequency detection device 309 contains a comparator device 401 and a microcontroller 403. The comparator device 401 compares the detected arc voltage ($V_{arc}$) with a voltage setpoint ($V_{setpoint}$) which is predetermined in various embodiments. In further exemplary embodiments the voltage setpoint (or whatever parameter setpoint is used) can be determined based on any one, some, or all of the input parameters 301. In such an embodiment, for example, the controller device 303 can use input parameters 301 to determine or provide a setpoint to the frequency detection device 309 to provide for the desired operation.

In an exemplary embodiment, the voltage setpoint can be between 5 to 14 volts. However, the present invention is not limited to these voltages. The microcontroller 403 is any known or conventional microcomputing device which is capable of receiving the signals from comparator 401 and emitting a signal representative of the detected shorting frequency of the welding arc ($f_{detected}$). The detection of the shorting frequency of the welding arc will be discussed below in conjunction with FIG. 5.

Figure 5:
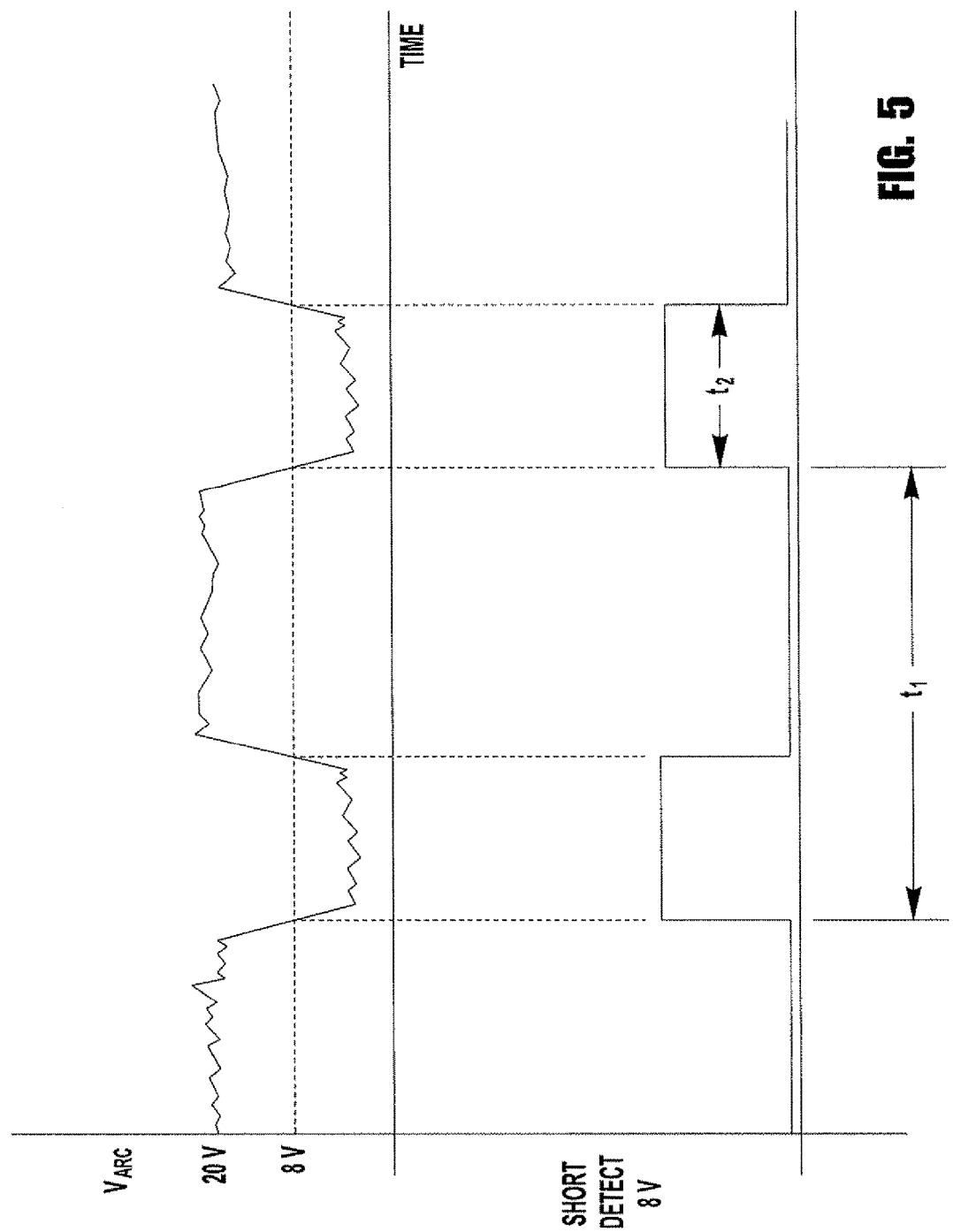
FIG. 5 illustrates a graphical representation of the voltage during a short circuit cycle as detected by an exemplary embodiment of the present invention.

FIG. 5 shows two graphs as a function of time. The uppermost graph shows a graphical representation of the detected arc voltage ($V_{arc}$) as a function of time. As can be seen, when no short exists the welding voltage is approximately 20 volts, and then when the welding electrode shorts, the voltage drops to some level below 8 volts. (It is noted that 8 volts has been selected for this example as the threshold voltage or voltage setpoint. However, another threshold voltage can be selected without departing from the scope or spirit of the present invention.) When the voltage drops below the voltage setpoint the microcontroller 403 generates a signal which is representative of welding arc shorting frequency and sends that signal to the summer 304.

The bottom graph of FIG. 5 depicts such a signal. As shown in this exemplary graph a signal is generated for the duration that the arc voltage is below the setpoint (8v) and then no signal is generated when the arc voltage is above the setpoint. The present invention, is capable of measuring different aspects of the waveform which can be used within the microcontroller 403. For example, as shown the time $t_1$ which is measured from the beginning of a short to the beginning of a next short shows the length of time between shorts such that $1/t_1$ represents the shorting frequency. Further, the time $t_2$ represents the duration of a short during the welding process. The microcontroller 403 can use any one, or both, of the short duration or the shorting frequency, and/or a duration of the non-short period to provide the frequency information to the summing circuit 304.

Based on the signal coming from the frequency detection device 309, which can be a voltage reference signal or the like, and the summing circuit 304, the waveform compensation device 305 and/or a combination of the waveform compensation device 305 and the power section 307 can adjust the welding waveform to maintain the desired frequency as provided by the controller 303. In an exemplary embodiment the current and/or voltage of the welding waveform is adjusted during the welding operation based on the information from the frequency detection device 309.

For example, if the frequency setpoint from the controller device 303 is set at 100 Hz, the system 300 will operate to maintain the 100 Hz frequency at the arc based up the shorting frequency detected at the arc through the frequency detection device 309. This is done without requiring the welder to guess or constantly adjust the voltage and/or current set points on the welding power supply prior to or during the welding operation.

Thus, various embodiments of the present invention allow for the dynamic adjustment of the welding waveform by determining the frequency of the arc short circuit and/or the duration of the arc short circuit and/or the duration of the arc non-short circuit time. The use of exemplary embodiments of the present invention allows for more efficient and better controlled welding, particularly during GMAW.

In an exemplary embodiment of the present invention the voltage setpoint for determining the short during the welding process is preselected by a welder. Thus prior to welding, a welder would input the setpoint to be used to determine when the short begin and ends. For example, as shown in FIG. 5, a setpoint of 8 volts was selected. In another exemplary embodiment of the present invention, the voltage setpoint for detecting the short is automatically set by the controller device 303, or a similar type device, based on the input parameters 301 entered by the welder. Thus, the controller device 303 (or similar type device) makes a determination, based on the input parameters 301, as to what an optimal setpoint voltage would be to properly determine the shorting frequency of the arc and sets that setpoint within the frequency detection device 309. For example, in an exemplary embodiment the voltage setpoint, as shown in FIG. 5, can be determined based on wire feed speed, electrode size and/or electrode type, as well as other parameters. Those of ordinary skill in the art, coupled with the information disclosed herein, are capable of implementing either of the above embodiments.

As discussed previously, the present invention is not limited to only using the arc voltage to determine the shorting frequency of the arc, but can also use other parameters of the arc, such as current or power. For example, in an exemplary embodiment which obtains feedback from the power at the arc the power level is monitored and when the arc power falls below a certain level (entered by the welder or determined by the controller device 303 or similar device) this will correspond to a short at the welding arc. That is, for example, a power setpoint of 1,000 watts can be determined or set and when the power falls below 1,000 watts it is recognized that a short has occurred. In such an embodiment a similar architecture and system can be used as described herein regarding voltage.

Embodiments of the present invention can be used with various forms of welding devices and types of welding methodologies. For example, the present invention can be employed in GMAW devices, short arc welding devices and pulse welding devices. Additionally, embodiments of the present invention can be employed in any welding systems in which the welding waveform has a frequency at the welding arc.

While the invention has been particularly shown and described with reference to exemplary embodiments thereof the invention is not limited to these embodiments. It will be understood by those of ordinary skill in the art that various changes in form and details may be made therein without departing from the spirit and scope of the invention as defined by the following claims.

What is claimed is:

1. A welding apparatus, comprising:
   a waveform compensation device;
   a power section coupled to said waveform compensation device which generates a welding waveform in accordance with a signal from said waveform compensation device and a welding arc based on said welding waveform; and
   a frequency detection device which detects at least one of a voltage, current and power of said welding arc and determines frequency information of said arc,
   wherein said waveform compensation device dynamically adjusts at least a portion of said welding waveform based on said frequency information;
   wherein said at least one of a voltage, current, and power is respectively compared to at least one of a voltage setpoint, a current setpoint, and a power setpoint; and
   wherein said frequency detection device uses at least one of a time duration of a short and a time duration of a non-short period to determine said frequency information.

2. The welding apparatus of claim 1, wherein said waveform compensation device dynamically adjusts at least one of a voltage and current of said welding waveform based on an output from said frequency detection device.

3. The welding apparatus of claim 1, further comprising a controller device which receives at least one input parameter and provides a welding frequency setpoint to said waveform compensation device based on said at least one input parameter.

4. The welding apparatus of claim 1, wherein said frequency detection device determines said frequency information based on said comparison.

5. The welding apparatus of claim 1, wherein said frequency detection device detects the voltage of said welding arc and determines said frequency information of said arc based on said detected voltage by comparing said detected voltage to said voltage setpoint.

6. The welding apparatus of claim 1, wherein said output from said frequency detection device is a detected shorting frequency of said welding arc.

7. The welding apparatus of claim 1, further comprising a controller device which receives at least one input parameter and provides a welding frequency setpoint to said waveform compensation device based on said at least one input parameter, and
   wherein said waveform compensation device dynamically adjusts said portion of said waveform to maintain said welding frequency setpoint.

8. The welding apparatus of claim 1, wherein said frequency detection device detects the current of said welding arc and determines said frequency information of said arc based on said detected current by comparing said detected current to said current setpoint.

9. The welding apparatus of claim 1, wherein said frequency detection device detects the power of said welding arc and determines said frequency information of said arc based on said detected power by comparing said detected power to said power setpoint.

10. The welding apparatus of claim 3, wherein the at least one input parameter at least one of welding electrode size, electrode type, shielding gas type, wire feed speed, welding voltage, welding current, welding power, travel speed, weld metal type, weld metal thickness and welding position.

11. The welding apparatus of claim 4, further comprising a controller device which receives at least one input parameter and wherein said at least one of said voltage setpoint, said current setpoint, and said power setpoint is determined based on said at least one input parameter.

12. The welding apparatus of claim 5, further comprising a controller device which receives at least one input parameter and wherein said voltage setpoint is determined based on said at least one input parameter.

13. The welding apparatus of claim 5, wherein said voltage setpoint is between 5 to 14 volts.

14. A method of welding, comprising:
    providing a welding signal to a power section;
    generating a welding waveform and a welding arc based on said welding signal;
    detecting at least one of a voltage, current, and power of said welding arc;
    determining frequency information of said welding arc;
    adjusting dynamically at least a portion of said welding waveform based on said determined frequency information; and
    comparing, respectively, said at least one of a voltage, current, and power to at least one of a voltage setpoint, a current setpoint, and a power setpoint,
    wherein said determining step uses at least one of a detected time duration of a short and a detected time duration of a non-short period to determine said frequency information.

15. The method of claim 14, wherein said adjusting step comprises dynamically adjusting at least one of a voltage and current of said welding waveform based on an output from a frequency detection device.

16. The method of claim 14, further comprising receiving at least one input parameter and providing a welding frequency setpoint for said welding signal based on said at least one input parameter.

17. The method of claim 14, further comprising determining said frequency information based on said comparison.

18. The method of claim 14, wherein said detecting step detects the voltage of said welding arc and said determining step determines said frequency information of said arc based on said detected voltage by comparing said detected voltage to said voltage setpoint.

19. The method of claim 14, further comprising receiving at least one input parameter and providing a welding frequency setpoint for said welding signal based on said at least one input parameter, and dynamically adjusting said portion of said waveform to maintain said welding frequency setpoint.

20. The method of claim 14, wherein said detecting step detects the current of said welding arc and said determining step determines said frequency information of said arc based on said detected current by comparing said detected current to said current setpoint.

21. The method of claim 14, wherein said detecting step detects the power of said welding arc and said determining step determines said frequency information of said arc based on said detected power by comparing said detected power to said power setpoint.

22. The method of claim 16, wherein the at least one input parameter at least one of welding electrode size, electrode type, shielding gas type, wire feed speed, welding voltage, welding current, welding power, travel speed, weld metal type, weld metal thickness and welding position.

23. The method of claim 17, further comprising receiving at least one input parameter and setting said at least one of said voltage setpoint, said current setpoint, and said power setpoint based on said at least one input parameter.

24. The method of claim 18, further comprising receiving at least one input parameter and setting said voltage setpoint based on said at least one input parameter.

25. The method of claim 18, wherein said voltage setpoint is between 5 to 14 volts.

26. A welding apparatus, comprising:
a waveform compensation device;
a power section coupled to said waveform compensation device which generates a welding waveform in accordance with a signal from said waveform compensation device and a welding arc based on said welding waveform;
a frequency detection device which detects at least one of a voltage, current and power of said welding arc to determine a time duration of a short of said arc, said time duration used to determine frequency information of said arc; and
wherein said waveform compensation device dynamically adjusts at least a portion of said welding waveform based on said frequency information.

27. The welding apparatus of claim 26, wherein said frequency detection device compares said detected at least one of voltage, current, and power to a setpoint and determines said time duration of said short based on said comparison.

28. The welding apparatus of claim 27, wherein said setpoint is a voltage setpoint that is between 5 to 14 volts.

29. A method of welding, comprising:
providing a welding signal to a power section;
generating a welding waveform and a welding arc based on said welding signal;
detecting at least one of a voltage, current and power of said welding arc;
determining frequency information of said arc based on a time duration of a short of said welding arc; and
adjusting dynamically at least a portion of said welding waveform based on said frequency information.

30. The method of claim 29, further comprising comparing said detected at least one of voltage, current and power to a setpoint and determining said time duration of said short based on said comparison.

31. The method of claim 30, wherein said setpoint is a voltage setpoint that is between 5 to 14 volts.

32. A welding apparatus, comprising:
a waveform compensation device;
a power section coupled to said waveform compensation device which generates a welding waveform in accordance with a signal from said waveform compensation device and a welding arc based on said welding waveform;
a frequency detection device which detects at least one of a voltage, current and power of said welding arc to determine a time duration of a non-short period of said arc, said time duration used to determine frequency information of said arc; and
wherein said waveform compensation device dynamically adjusts at least a portion of said welding waveform based on said frequency information.

33. The welding apparatus of claim 32, wherein said frequency detection device compares said detected at least one of voltage, current, and power to a setpoint and determines said time duration of said non-short period based on said comparison.

34. The welding apparatus of claim 33, wherein said setpoint is a voltage setpoint that is between 5 to 14 volts.

35. A method of welding, comprising:
providing a welding signal to a power section;
generating a welding waveform and a welding arc based on said welding signal;
detecting at least one of a voltage, current and power of said welding arc;
determining frequency information of said arc based on a time duration of a non-short period of said welding arc; and
adjusting dynamically at least a portion of said welding waveform based on said frequency information.

36. The method of claim 35, further comprising comparing said detected at least one of voltage, current and power to a setpoint and determining said time duration of said non-short period based on said comparison.

37. The method of claim 36, wherein said setpoint is a voltage setpoint that is between 5 to 14 volts.

38. A welding apparatus, comprising:
a waveform compensation device;
a power section coupled to said waveform compensation device which generates a welding waveform in accordance with a signal from said waveform compensation device and a welding arc based on said welding waveform; and
a frequency detection device which detects at least one of a voltage, current and power of said welding arc and determines frequency information of said arc,
wherein said waveform compensation device dynamically adjusts at least a portion of said welding waveform based on said frequency information;
wherein said at least one of a voltage, current, and power is respectively compared to at least one of a voltage setpoint, a current setpoint, and a power setpoint; and
wherein said frequency detection device uses a time duration between detected shorts and a time duration of a short and a time duration of a non-short period to determine said frequency information.

39. The welding apparatus of claim 38, wherein said setpoint is a voltage setpoint that is between 5 to 14 volts.

40. A method of welding, comprising:
providing a welding signal to a power section;
generating a welding waveform and a welding arc based on said welding signal;
detecting at least one of a voltage, current, and power of said welding arc;
determining frequency information of said welding arc;
adjusting dynamically at least a portion of said welding waveform based on said determined frequency information; and
comparing, respectively, said at least one of a voltage, current, and power to at least one of a voltage setpoint, a current setpoint, and a power setpoint,
wherein said determining step uses a detected time duration between detected shorts and a detected time duration of a short to determine said frequency information.

41. The method of claim 40, wherein said setpoint is a voltage setpoint that is between 5 to 14 volts.

42. A welding apparatus, comprising:
a waveform compensation device;

a power section coupled to said waveform compensation device which generates a welding waveform in accordance with a signal from said waveform compensation device and a welding arc based on said welding waveform; and a frequency detection device which detects at least one of a voltage, current and power of said welding arc and determines frequency information of said arc, wherein said waveform compensation device dynamically adjusts at least a portion of said welding waveform based on said frequency information;

wherein said at least one of a voltage, current, and power is respectively compared to at least one of a voltage setpoint, a current setpoint, and a power setpoint; and wherein said frequency detection device uses a time duration between detected shorts and a time duration of a non-short period to determine said frequency information.

43. The welding apparatus of claim 42, wherein said setpoint is a voltage setpoint that is between 5 to 14 volts.

44. A method of welding, comprising:
providing a welding signal to a power section;
generating a welding waveform and a welding arc based on said welding signal;
detecting at least one of a voltage, current, and power of said welding arc;
determining frequency information of said welding arc;
adjusting dynamically at least a portion of said welding waveform based on said determined frequency information; and
comparing, respectively, said at least one of a voltage, current, and power to at least one of a voltage setpoint, a current setpoint, and a power setpoint,
wherein said determining step uses a detected time duration between detected shorts and a detected time duration of a non-short period to determine said frequency information.

45. The method of claim 44, wherein said setpoint is a voltage setpoint that is between 5 to 14 volts.

* * * * *